United States Patent [19]

Desjardins

[11] Patent Number: 5,395,527

[45] Date of Patent: Mar. 7, 1995

[54] PROCESS AND APPARATUS FOR TREATING WASTEWATER IN A DYNAMIC, BIO SEQUENCED MANNER

[75] Inventor: Gaétan Desjardins, Repentigny, Canada

[73] Assignee: Eco Equipement Fep Inc., Anjour, Canada

[21] Appl. No.: 84,595

[22] Filed: Jul. 1, 1993

[51] Int. Cl.$^6$ ............................................. C02F 3/20
[52] U.S. Cl. ................................. 210/608; 210/629; 210/208; 210/220; 210/525; 210/921
[58] Field of Search ............... 210/608, 525, 921, 620, 210/629, 205, 208, 219, 220

[56] References Cited

U.S. PATENT DOCUMENTS

| | | | |
|---|---|---|---|
| 4,568,458 | 2/1986 | Maclean | 210/197 |
| 4,663,044 | 5/1987 | Goronszy | 210/610 |
| 4,681,852 | 7/1987 | Tribe | 435/108 |
| 4,693,821 | 9/1987 | Goronszy et al. | 210/525 |
| 4,724,073 | 2/1988 | Calltharp et al. | 210/525 |
| 4,883,602 | 11/1989 | Anderson | 210/525 |
| 5,106,494 | 4/1992 | Norcross | 210/525 |

FOREIGN PATENT DOCUMENTS

| | | |
|---|---|---|
| 4661685 | 3/1986 | Australia . |
| 4661785 | 3/1986 | Australia . |
| 1295058 | 1/1992 | Canada . |

OTHER PUBLICATIONS

Advertising brochure of Degremont entitled: "Le Pulsator" date unknown.
Peter L. Timpany, "Application of the modified sequencing batch reactor process for the pulp and paper industry".
Stanley Industrial Consultants Ltd., 1991.

Primary Examiner—Thomas Wyse
Attorney, Agent, or Firm—ROBIC

[57] ABSTRACT

A process for treating wastewater in a dynamic bio-sequenced manner in a single SBR reactor already filled with an activated sludge mixed liquor. In this process which is simple, fast and biologically and hydraulically "on going" and which allows one single SBR reactor to process typically twice as many batches of water per day as is presently processed within the existing SBR process, a given amount of wastewater rapidly introduced into the SBR reactor below the clear water level to cause the level of the wastewater within the tank to raise relatively uniformly and vertically and the supernatant clarified water to enter decantation pipes and be discharged out of the reactor. Then, the scum floating on top of the wastewater is collected and discharged and the mixed liquor is mixed and aerated as long as necessary to achieve the required treatment. The mixed liquor may further be stirred to bring the sludge totally in suspension within the liquor and a supplemental amount of wastewater added into the reactor to cause a corresponding amount of mixed liquor containing excess sludge to overflow. Then the sludge in suspension is allowed to settle for a period of time sufficient to avoid solids-to be carried out with the supernatant water when another given amount of wastewater is introduced into the reactor to repeat the above sequence of steps. Also disclosed is a dynamic clarifier for use to carry out this process.

14 Claims, 3 Drawing Sheets

PROCESS AND APPARATUS FOR TREATING WASTEWATER IN A DYNAMIC, BIO SEQUENCED MANNER

BACKGROUND OF THE INVENTION a) Field of the Invention

The present invention relates to a fast and simple process for treating wastewater in a dynamic bio-sequenced manner in a single sequencing batch reactor of particular structure.

The invention also relates to an apparatus hereinafter called "dynamic clarifier" which incorporates a single sequencing batch reactor of particular structure, for use to carry out the above process.

This word "dynamic" as opposed to "static" is indicative of a clarification process and apparatus where solids are allowed to settle down while clarified water is allowed to raise toward the surface to reach effluent collection pipes or trough from which they are discharged out of the apparatus as treated water.

b) Brief Description of the Prior Art

Sequencing batch reactor (SBR) processes making use of static clarifiers equipped with aeration/mixing and decanting means, are well known processes that have extensively been used over the years to treat industrial and municipal wastewater.

Originally, in the early 1900's, this kind of process was developed to carry out what was then called "activated sludge process" using a "fill/draw" methodology. At that time, this methodology or mode of operation was judged impractical for several reasons, including a lack of responsive controls, air diffuser plugging, inexisting proper decanting apparatus and significant delay periods required for carrying out every necessary step of the sequence process.

Today, most of these difficulties have been overcome, because all the manufacturers have developed and now use logic programmable controllers (PLC), non-clog aeration devices and solids excluding decanters. But still today, processing of wastewater within such reactors continues to be very slow as each step must proceed before the next one can be initiated. As a matter of fact, the process is not seen as an "on going" process because about 30 to 50% of the sequence of operation of the SBR processes are spent in waiting time.

In order to better emphasize this problem, the sequence of steps of a standard SBR process will now be described.

Filling Step

The first step of the process is essentially a "filling step".

The purpose of this step is to introduce a given batch volume of wastewater into one of the reactors already containing some biomass or "liquor". Normally, such an introduction is not regulated and wastewater is fed continuously with some high and low flow variation rates. Of course, one must wait for quite a long time in order for the reactor to finally contain the necessary volume to allow the subsequent process steps to be carried out. Quite often, this period of time is so long that the next step of the process, which is an aeration step, must even be initiated before the filling step is completed. This is not an ideal situation as the quality of the reaction depends on the initial wastewater concentration and the anaerobic/anoxic/aerobic biological activities control. Therefore, the feed rate is a critical factor in the overall process and there would be substantial gains in drastically shortening the filling period.

So far, this hydraulic problem has been handled by using two or more reactors. Typically, the time necessary to introduce one batch volume in one of the reactors should be equal to the time necessary to treat the previous batch introduced in the other reactor. The flow of "fresh" wastewater is therefore directed alternatively from one reactor to the other using control valves or other similar devices.

Reaction Step

The second step of the standard SBR process is a reaction step.

The purpose of this step is to provide mixing and oxygenation to cause the biomass to develop and absorb the soluble organics dissolved in the wastewater.

This step must be carried out for a period of time for the bacteria to absorb these organic matters. It calls for the injection of air in the liquid and dissolution of oxygen by means of an aeration equipment. Sometimes, the oxygenation and mixing are provided by mechanical aerators rather than by air diffusers and blowers.

Settling Step

The third step of the standard SBR process is a settling step.

The purpose of this step is to allow the activated sludge solids to separate from the clear water prior to proceed with final discharge of the treated water out of the reactor. These solids can have different settling characteristics depending on many factors and thus can settle at different rates and with different efficiencies. The normally expected time allowed for this period varies from 45 minutes to 120 minutes. Again, this is a time-consuming operation but this operation is as important as all the others to achieve the required quality of treatment.

Decantation Step

The last step of the standard SBR process is a decantation step.

The purpose of this last step is simply to remove and discharge the treated water on top of the reactor after settling of the solids. This top layer of water consists of the supernatant liquor located in the superior top section of the reactor. Once again, it is essential to accelerate as much as possible this other time-consuming step without risking to drain out the activated sludge solids that, at this state, are settled down in the lower part of the same reactor.

These main four (4) steps can be found in all the SBR processes and must be taken into account by the SBR equipment manufacturers. Mainly because all of these steps are time-consuming to carry out and require specific delays, two or more reactors are always used in practice, thereby giving each reactor the time necessary to complete all the steps according to the hydraulic conditions and the required treatment level.

OBJECTS OF THE INVENTION

A first object of the present invention is to provide a much faster and simpler SBR process that is biologically and hydraulically "on going" and can accommodate any hydraulic conditions and achieve a required treatment within a shorter period of time, using one SBR reactor only and a wastewater source preferably consisting of a single equalization tank separate from the reactor.

Another object of the invention is to provide a SBR process having such an improved sequence of steps that it allows one single SBR reactor to process typically twice as many batches of water per day as is presently processed within the existing SBR processes. As these batches have a volume comparable to the one used in the standard SBR processes, the rated capacity of the process according to the invention can therefore be increased and typically doubled as compared to the standard process.

A further object of the invention is to provide a dynamic clarifier for use to carry out the above mentioned SBR process according to the invention.

SUMMARY OF THE INVENTION

In accordance with -the invention, the above objects are achieved with a process for treating wastewater in a dynamic bio-sequenced manner in a single SBR reactor already filled with an activated sludge-mixed liquor up to a relatively constant level and provided with:

a) decantation means which are fixedly mounted inside the SBR reactor at a given height hereinafter called "clear water level", and in and through which supernatant water on top of the mixed liquor within the SBR reactor may freely enter and be discharged out of the reactor when the level of this liquor within the reactor reaches the decantation means; and b) scum and excess sludge removal means which are fixedly mounted within the reactor at a short elevation under the clear water level and in and through which floating scum and excess sludge in suspension may be collected at the end of every decantation step and discharged out of the SBR reactor.

The process according to the invention comprises the steps of:

a) rapidly introducing a given amount of wastewater to be treated into the SBR reactor below the clear water level, such a rapid introduction causing the level of the mixed liquor within the tank to raise relatively uniformly and vertically and the supernatant clarified water to enter the decantation means and be discharged out of the reactor;

b) actuating the scum and excess sludge removal means to collect and discharge the scum floating on top of the wastewater filling the SBR reactor, such an actuation also causing the level of the wastewater within the SBR reactor to move down below the clear water level of the decantation means;

c) mixing and aerating the mixed liquor within the SBR reactor as long as necessary to achieve the required treatment;

d) optionally stirring the mixed liquor in a controlled manner within the SBR reactor to bring the sludge totally in suspension within the liquor, and then adding a supplemental amount of wastewater into the SBR reactor to cause a corresponding amount of mixed liquor containing excess sludge to overflow into the scum and excess sludge removal means and thus be removed from the SBR reactor for optional treatment into a digester or a sludge holding tank;

e) allowing the sludge in suspension in the liquor to settle for a period of time sufficient to avoid solids to be carried out with the supernatant water when another given amount of wastewater is introduced into the reactor; and f) repeating as long as required steps a) to e) in this order.

In accordance with the invention, there is also provided a dynamic clarifier for use to treat wastewater in a bio-sequenced manner, this clarifier comprising:

a) a single SBR reactor filled with an activated sludge-mixed liquor up to a relatively constant level;

b) decantation means fixedly mounted inside the SBR reactor at a given height, hereinafter called "clear water level", and in and through which supernatant water on top of the mixed liquor within the SBR reactor may freely enter and be discharged out, the decantation means comprising at least one member selected from the group consisting of perforated pipes and troughs connected to at least one water exhaust pipe leading outside the SBR reactor;

c) scum and excess sludge removal means fixedly mounted within the SBR reactor at a short elevation under the clear water level and in and through which floating scum and excess sludge in suspension may be collected and discharged out of the SBR reactor, the scum and excess sludge removal means comprising at least one trough connected to a common scum and excess sludge exhaust pipe and means to open and close the scum exhaust pipe to let the scum and excess sludge to be discharged and the level of the wastewater within the SBR reactor to move down below the clear water level of the decantation means;

d) a batch feed pump for rapidly introducing wastewater to be treated into the SBR reactor below the clear water level, such a rapid introduction causing the level of the mixed liquor within the SBR reactor to raise relatively uniformly and vertically-and the supernatant clarified water and excess sludge to enter the decantation means and be discharged out of the reactor; and e) means for mixing and aerating the mixed liquor within the SBR reactor as long as necessary to achieve the required treatment, these means being selected from the group consisting of jet aerators, air diffusers, submerged turbines and mechanical mixers.

Advantageously, the dynamic clarifier according to the invention may also comprises an equalization tank adjacent the single SBR reactor and in which the wastewater to be treated may be accumulated and pretreated if desired, this tank being in direct communication with the batch feed pump.

As can now be understood, the process according to the invention is advantageous in that it requires only one single SBR reactor instead of using several SBR reactors which have to alternate on a sequence mode. It also requires only one batch feed pump to rapidly force and uniformly distribute a batch of wastewater at the bottom of the reactor. In this connection, the equalization tank may typically be sized for a minimum of one batch plus the necessary volume to accommodate expected peak flow. The equalization tank can be used for storing wastewater, exclusively. Alternatively, it can be used as an anaerobic fermentation reactor to pretreat the wastewater prior to its aerobic SBR treatment in the SBR reactor, or as a primary clarifier to removable settable solids from the wastewater. In these cases, solids accumulation will be encouraged at the bottom of the equalization tank. The single SBR reactor used in the process must of course be sized according to standard guide lines such as biokinetic coefficients of the wastewater and specific overflow settling rates, so as to achieve the required treatment and provide the required separation of the effluent when operated into an "upflow dynamic clarification mode".

Since, in the process according to the invention, the SBR reactor remains filled up to a relative constant level, the introduction of a new batch of wastewater forces the supernatant clarified water to overflow into the collector pipes or troughs forming the decantation means and to be discharged out of the reactor, thereby initiating the "decantation stage" simultaneously with the "filling stage". In this connection, the invention addresses one of the most critical aspects of the standard process. Indeed, as the water level remains pretty much constant during the whole sequence, fixed collector pipes and/or though can be used as decantation means. Such means that are used to collect the treated water represents one of the best types of "solid exclusion" decantation equipment presently available, as it is located out of the water during the "reaction" and "settling" steps, in addition of being very simple, foul-proof and non-mechanical.

Once the supernatant clarified water has been discharged from the top of the SBR reactor by introduction of a new batch of wastewater to be treated in the same SBR reactor, an inter-step must be carried out prior to proceeding to mixing and aeration treatment of the wastewater. This inter-step consists in lowering by a few inches the liquid level below the collecting orifices or notches of the decantation means so that this decantation means is physically located above the liquid. The water that needs to be removed to achieve this water level drop contains floatable solids (scum) and can be directed by gravity back into the equalization tank, if any, or preferably into a sludge holding tank (digester), via a set of controlled valves. This slight level drop is mandatory so that the fixed, solid-exclusion decantation means design parameters are maintained. This water level drop is ideal to remove the scum which contains a high concentration of grease and filamentous bacteria that are known to decrease the treatment efficiency.

Optionally, the excess sludge generated by the process may also be removed at the end of every cycle or once per day after the scum removal inter-step has been completed, using the same batch feed pump and scum removal means as above to direct excess sludge towards a sludge holding tank (digester).

BRIEF DESCRIPTION OF THE DRAWINGS

The invention and the way it works will be better understood upon reading of the following, more detailed but non-restrictive description thereof, given with reference to the accompanying drawings in which.

For the purpose of simplicity, the same reference numerals have been used in all the figures of the accompanying drawings to identify the same structural elements.

DETAILED DESCRIPTION OF THE SUCCESSIVE STEPS OF THE PROCESS ACCORDING TO THE INVENTION

I - COMBINED FILLING AND DECANTATION

In accordance with the invention, the filling and decantation steps of the standard SBR process are combined together and will always occur simultaneously. This "combination" forms the first step of the process according to the invention.

A-filling

In the first step of the process according to the invention, a complete or selected volumetric batch of wastewater to be treated is fed with a batch feed pump 1 into the SBR reactor 3 of the dynamic clarifier according to the invention in just a few minutes typically 1 to 180 minutes, and preferably 15 to 90 minutes.

This step occurs at the end of the "reaction" step, after a typical, short "settling" period of 15–30 minutes which is actually necessary to allow the biomass to settle down at a minimum distance from the water surface. In this connection, it is worth mentioning that, in accordance with the invention, the reactor remains full at all times after it has been filled up once. The decantation movement of the treated water takes place with a rising water current rather than with a descending one.

After this short "settling" step, the batch-fill pump 1 is actuated and quickly introduces one volumetric batch into the SBR reactor.

Figure 1:
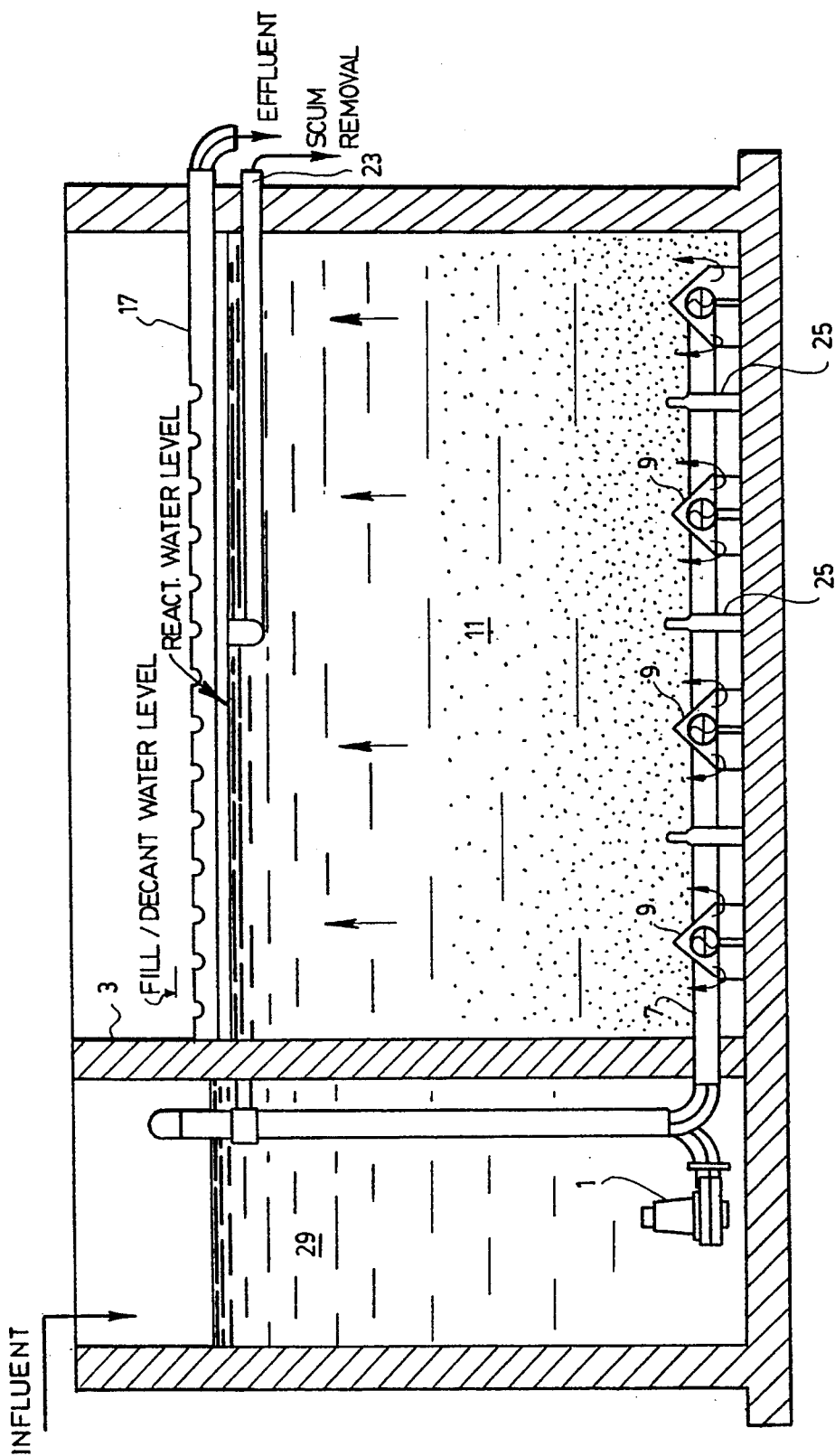
FIG. 1 is a schematic, cross-sectional representation of a full floor-fed clarifier adapted to carry out the process according to the invention.

In the embodiment shown in FIG. 1, the new batch is well distributed at the bottom of the reactor via a perforated, hydraulically balanced, inlet flow distribution piping 7 associated with distributing baffles 9 anchored at the bottom of the reactor. The whole SBR reactor is then converted into a "dynamic upflow clarifier" that is preferably dimensionned to operate at about 0.5 to 2.0 USGPM per square foot (more preferably about 1.0 USGPM per square foot). It is worth mentioning that, with such a configuration, the flow of wastewater fed into the reactor is slowly and uniformly forced vertically through the sludge blanket 11 so that biological activity is maintained at a high degree and at all times. However, the invention is not restricted to the particular embodiment and would similarly be carried out efficiently within other kinds of clarifiers, such as a peripheral feed clarifier as shown in FIG. 2 or a central feed clarifier as shown in FIG. 3.

Figure 2:
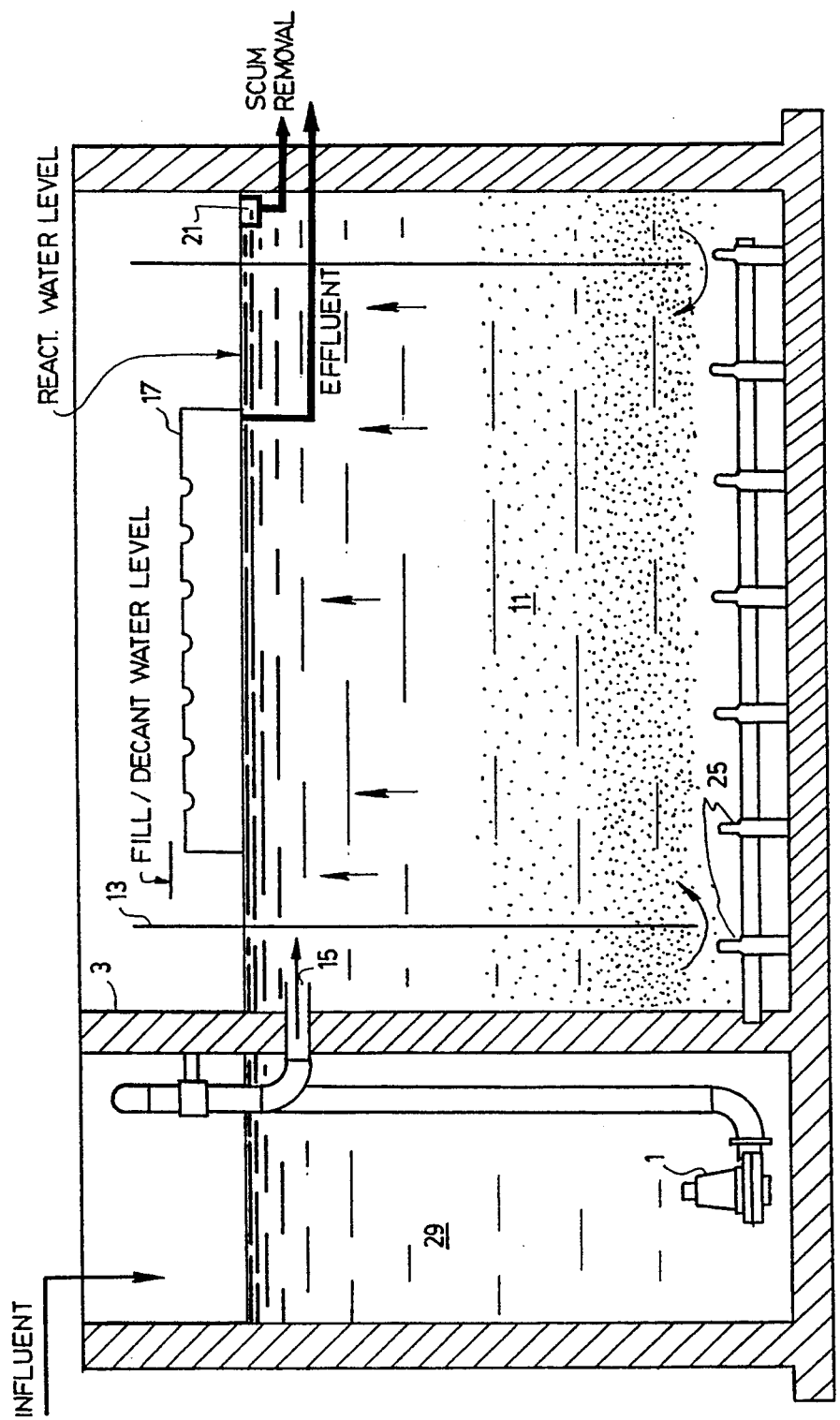
FIG. 2 is a similar representation of a peripheral feed clarifier adapted to carry out the process according to the invention.
Figure 3:
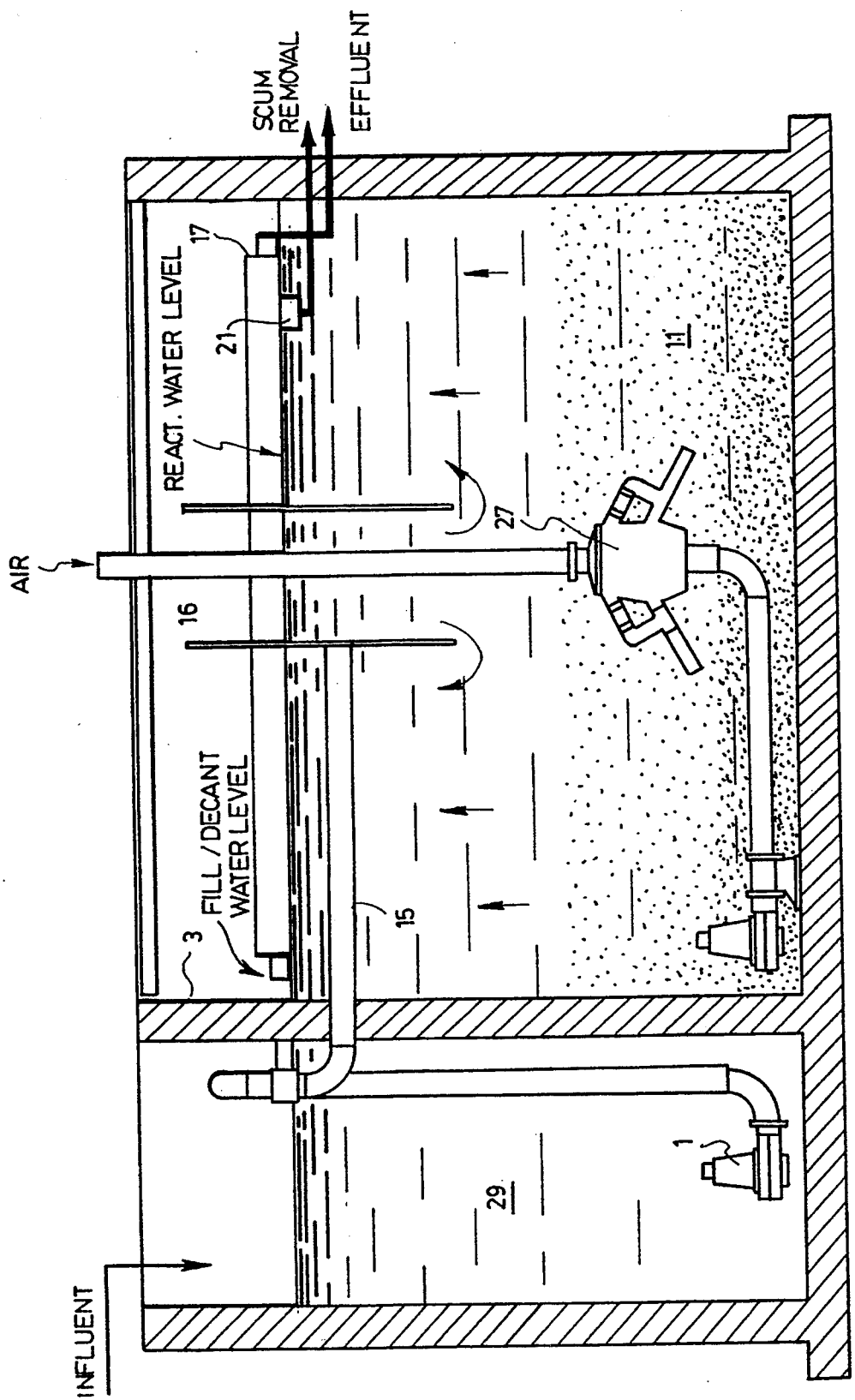
FIG. 3 is a similar representation of a central feed clarifier adapted to carry out the process according to the invention.

In the embodiment shown in FIG. 2, the reactor 3 comprises a peripheral flow distributing baffle 13 that extends within the wastewater and projects upwardly above the top level of the same. Then, the outlet 15 of the pump 1 is located outside the peripheral flow distributing baffle 13, preferably at a short distance below the top water level.

In the other embodiment shown in FIG. 3, there is no peripheral flow distributing baffle 13 but the outlet 15 of the pump 1 is still located at a short distance below the water level within the reactor.

B - Decantation

This step is an inherent part of the "filling step" as it occurs simultaneously. Therefore, no further time is to be devoted for "decantation". Indeed, in accordance with the invention, as the batch feed pump 1 introduces rapidly a batch of wastewater over the whole bottom of the reactor, all the treated supernatant water is simultaneously collected uniformly across the whole surface of the same SBR reactor 3 by a decantation means 17 that preferably consists of perforated collector pipes and/or slotted troughs connected to at least one water exhaust pipe through which the treated water may be discharged out of the reactor as a treated effluent.

The collectors and/or troughs 17 are fixedly mounted within the reactor 1 at the water surface to readily collect and discharge the treated water out of the SBR reactor. Uniform wastewater distribution and treated wastewater collection are achieved using head loss through the perforations made in the pipe networks.

The clear water level simply raises by a few inches up to the decantation means when the batch fill pump is operated. Therefore, withdrawal of treated water is accomplished from the whole water surface with no mechanical means whatsoever as soon as a new batch of wastewater is fed into the reactor. Thus, the decantation means are "static" non mechanical and truly of the "solids exclusion" type.

As can be appreciated, the process according to the invention allows a considerable amount of time to be gained when compared with the standard SBR process, as the "decantation" period is completely included in the "filling" period. As aforesaid, the "filling" period is also considerably reduced (1 to 30 minutes typically), thereby making the process according to the invention very "time-efficient".

C - Miscellaneous (a) The fact that the SBR reactor is filled rapidly permits to save considerable time as compared to the conventional filling step of the SBR process, where the reactor is filled at a rate dictated by the actual wastewater flow condition, the filling time being then from 60 minutes to 24 hours (1 to 12 hours typically).

(b) Such a "fast filling" also provides enough energy to rapidly disperse the new wastewater within the reactor and uniformly mix and contact it with the microorganisms concentrated at the bottom of the reactor. Therefore, the organic absorption reaction will be immediately initiated in a very uniform and efficient way across the whole SBR reactor. In full contrast, the standard process calls for a mechanical mixing to be carried out first to achieve the same goal. As the filling step can also replace the normal mixing step provide anoxic conditions of the biomass, energy can be saved, as well as time.

(c) "Fast filling" also represents a powerful means for quickly modifying the biological conditions of the biomass from "aerobic" into "anoxic" and "anaerobic" conditions in a more efficient way. This condition favours many desirable biological reactions to occur, two of which will now be described in greater details.

Biological Phosphorus Removal

This reaction occurs when bacteria are forced from an aerobic to an anoxic/anaerobic mode of life. Usually, this is done by causing an oxygen deficit in the reactor. A well-controlled deficit will lead to a better overall reaction. Several families of micro-organism are called "facultative" and have the capacity to "mute" into an anaerobic mode of life. Anoxic condition describes the interstate between aerobic and anaerobic life condition where the aerobic bacteria are literally starved out of free dissolved oxygen. Nitrates become then the only source of oxygen for the microorganisms. As the anoxic condition progresses and is well-controlled throughout the reactor, denitrification will occur and the microorganisms will start releasing their phosphorus content into the water as anaerobic conditions progress. This step is important and must be well time-controlled to obtain the best possible phosphorus release and fatty acids storage to occur in the biomass so that the next "aerobic" switch (imposed onto the bacteria by providing sudden generous oxygen availability) is also at its maximum. This operation will indeed force the bacteria to absorb a greater quantity of phosphorus (typically 8 to 10%) than what they really need for the aerobic metabolism (typically 1 to 2%).

It is worth mentioning the above described phosphorus removal capacity can be significantly increased (almost doubled) if the equalization tank is converted to a anaerobic fermenter in which the organic matters in the wastewater are more efficiently transformed into fatty acids (acetates, propylates) before the wastewater is transferred into the SBR reactor. Fatty acids are easily absorbed and stored by the bacteria and the amount of fatty acids that are so stored, directly influences the phosphorus removal capacity of the bacteria when aerobic conditions are restored. The maximum bacteria phosphorus absorption capacity has been observed to reach 18% per weight in laboratory when sufficient quantity of fatty acids were stored in the bacteria during the anaerobic period. Therefore, there is a great benefit in converting the equalization tank to an anaerobic fermenter which may work in combination with the SBR reactor. In accordance with the invention, thanks to the anaerobic conditions in the equalization tank, the "fast filling" and efficient mixing conditions that derive from the same, phosphorus removal reaction can be significantly improved.

Biological Selector Effect

It is known that selective bacteria growth control is possible over the main types of micro-organisms present in a reactor (mainly filamentous and floc forming microorganisms). It has been observed that specific growth rate of these micro-organisms are different and vary in accordance with the surrounding wastewater substrate concentration. When subjected to high concentrations of substrate, the floc forming bacteria will have a much higher growth rate when compared with the filamentous one. The opposite is true when these bacteria are subjected to a low concentration of substrate.

Complete inhibition of the filamentous bacteria is not desirable and is not likely to occur normally.

Therefore, it is important to balance the population of bacteria so that just enough filamentous bacteria are present to serve as a fixed support for the floc forming bacteria to grow over them. Such flocculated biomass will tend to attract most of the dispersed floc particles, therefore removing a higher amount of suspended solids. The floc forming population must be sufficient to well cover these long filaments, neutralizing their adverse settling characteristics by forming large flocculated particles that will contribute to improved biomass settling characteristics.

In accordance with the invention, such a desirable microorganism balance is also achieved thanks to the "fast filling" and efficient mixing conditions that derive from the same.

(d) "Fast filling" further creates an unusual and extremely high "food abondant" condition through the whole reactor. This sudden condition occurs right after a "food starving" condition at the end of the aeration stage. This condition also favours many other desirable reactions to occur which will now be described in greater details.

Enhancement of the overall "Carboneous Absorption Rate"

Such an enhancement allows the biomass to absorb (i.e. synthesis) much faster the soluble organic matters (one of the major pollutants included in the wastewater), therefore reducing the necessary "reaction time". This is caused by the predominant floc forming bacteria population generated by the true "batch filling" which is of the most active type. The time saving achieved with such a feed mode is estimated to reach 40 to 60% of the normal reaction time required for a "continuous feed" activated sludge process.

Enhancement of the Overall "Oxygen Transfer Rate" in the Wastewater

Such an enhancement is due to higher absorption rate of the micro-organisms and higher gradient forces between the oxygen saturation equilibrium and the actual very low values of dissolved oxygen in the reactor (close to zero). This also contributes to reduce the necessary "reaction time" which in turn results in:
- economy of energy, as the equipment operates for shorter periods of time; and
- increased treatment capacity of the SBR equipment as the gained time can be used to treat greater volumes of wastewater in the same reactor in a given time. This enhancement rate is closely correlated to the enhancement rate of the previous synthesis rate of the soluble organics as oxygen presence becomes the main catalyst of such a biological reaction.

II - SCUM REMOVAL

In accordance with the invention, it is compulsory to activate "scum removal means" 19 fixedly mounted within the reactor 3 after completion of the combined filling and decantation step in order to cause the level of wastewater within the reactor to move down below the clear water level corresponding to the decantation means.

As is shown in the drawing, the scum removal means comprises at least one trough connected to a scum exhaust pipe 21 and means 23 to open and close the scum exhaust pipe to let the scum to be discharged and the level of the water within the tank to move down below the clear water level of the decantation means prior to initiating any mixing and/or aeration steps.

Thus, after completion of the combined filling and decantation step, scum which contains a high concentration of filamentous bacteria is removed by lowering quickly the water level by a few inches below the clear water collecting orifices. Surface water withdrawal advantageously carried out all the floating scum.

The water utilized to transport the scum to the digester or to the thickener will contain enough oxygen to advantageously assist and sometimes solve an odor problem in these basins where high concentration of sludge exists.

This second step is mandatory to ensure that the orifices of the decantation means stand above the water surface so that no mixed liquor or water can be introduced in the decanting pipes when the mixing and aeration step is started. This in turn allows the use of simple, rigidly fixed, solid-exclusion decantation means.

III - EXCESS SLUDGE REMOVAL

To remove the excess of sludge that will accumulate within the SBR reactor, one may use a simple draw-off pipe (with or without perforations) drawing from the settled sludge.

Alternatively and preferably, the excess sludge generated by the process may also be removed at the end of every cycle or once per day after the scum removal inter-step has been completed, using the same batch feed pump and scum removal means as above to direct the excess sludge towards a sludge holding tank or digester.

In such a case, the mixed liquor within the SBR reactor is stirred in a controlled manner within the SBR reactor to bring the sludge totally in suspension within the liquor. Then, the batch feed pump may be operated to add a supplemental amount of wastewater into the SBR reactor to cause a corresponding amount of mixed liquid containing excess sludge to overflow into the scum and excess sludge removal means and thus be removed from the SBR reactor for optional treatment into a digester or sludge holding tank. This last way of wasting the excess sludge allows a precise control on sludge age regardless of sludge compaction when settled (measured as Sludge Volum Index).

IV - REACTION

Once the water level has dropped a few inches below the orifices of the decantation means, the "reaction" cycle may begin and last for the necessary period of time to achieve the required treatment. Whenever necessary, the first reaction will be an anoxic one, so that the oxygen presence be reduced to the nitrate form only. Through denitrification, the nitrates will be denitrified. Anaerobic conditions may also be necessary and will be obtained by extending the mixing period, exclusively. The last reaction will be an aerobic one, where volatile organic matters are "converted" to active bacteria and ammonia to nitrate.

Such a treatment can be carried out as in known per se i.e. by mixing and aerating the mixed liquor within the tank using jet aerators or air diffusers 25, submerged turbines 27 fed by pumps and connected to air supplies, and/or mechanical mixers.

The purpose of this step is of course to provide necessary contact of the biomass with the substrate by mixing and aeration to promote alternative anoxic, anaerobic and aerobic modes operation. This step only begins when the reactor contains its full or pre-selected batch of new wastewater. As stated earlier, many treatment advantages are gained by such operation.

Once again, the "reaction" period in the process according to the invention is shortened as compared to the standard SBR process, thanks to the more efficient activity of the biomass promoted by the "fast filling" step. Of course, the mixing and aeration steps must be carried out in a definite sequence and as long as necessary until the pollutants (C,N,P) are reduced to a desirable level.

V - SETTLING

In accordance with the invention, a short static "settling" period is required to allow the well flocculated activated sludge to settle down to an acceptable level so as to avoid solids to be carried out when the SBR reactor is fed again and the clear supernatant water is forced uniformly and vertically up to the perforated collector piping or trough level extending just a few inches above the water surface.

Here again, time is gained as compared to the standard SBR process as, in the process according to the invention, the settling period is reduced to 15–30 minutes only. In this connection, it is worth mentioning that settling continues to occur during the subsequent "filling-decantation" step, that is when the reactor is converted into a "dynamic upflow clarifier".

In other words, the settling step starts with a "static" clarification period as in the standard SBR processes, and continues in a "dynamic" manner when the combined filling and decantation step is carried out with the introduction of another batch of wastewater.

Thus, the static "settling" step completes the total sequence steps of a typical treatment cycle according to this invention, because no further decantation is required, such a decantation being combined with the subsequent "filling". Also, the rest of the dynamic settling occurs during the "filling-decantation" step. As a result, the overall time savings can easily achieve up to 50% and over of a standard SBR sequence. Therefore, the process according to the invention can be rated for typically twice the hydraulic capacity of a standard SBR process.

GENERAL DESCRIPTION OF THE INVENTION

SBR technologies have progressed considerably worldwide for the last ten (10) years. Nevertheless, the limits of this well known process are still not well understood in many instances. Today, most engineers and manufacturers are still designing SBR reactors using continuous (FED) flow process knowledge and design data such as biokinetic coefficients, apparent F/M ratio, hydraulic retention time and other design parameters established for continuous flow operation process. However, there is a great difference between the reaction rate of a "continuous flow" biological system or semi-batch (fill and drain process) and the one of a true SBR batch system. The overall quality of the treated effluent is also known to vary as a function the composition of the biomass. Moreover, in many instances, it has been found that the SBR performances are improved when the reactor volume is smaller and reaction time is shortened.

The process according to the invention incorporates all these recognized advantages in a very simple yet efficient manner.

1. True SBR Process.

The process according to the invention is a true SBR process inasmuch as all the reactions (i.e. mixing and aeration) occur once the reactor has accepted a full or pre-selected batch of "new" wastewater. No aeration period takes place during the "filling" step. On the other hand, efficient biomass contact with the new substrate occur as a simultaneous "fill and mix" process.

2. One Tank Process.

In accordance with the invention, only one SBR reactor is required to handle wastewater with full hydraulic/organic capacity. There is no requirement for a plurality of reactors that must work in an alternate manner to accept the wastewater flow while the other reactor(s) is(are) allowed to complete its(their) of "settling" and "decantation" steps. For very large plants or for redundancy purposes, the invention can use several SBR reactors. However, in such a case, each reactor forms a self-sufficient treatment plant by itself and does not depend on another reactor to sequentially accept the hydraulic flow while one reactor is completing its treatment and to discharge its treated batch of water. In other words, the hydraulic flow is equalized in the equalization tank only, not in the SBR reactor.

The inherent physical advantages that derives from the one reactor process are according to the invention as follows:
- economy in capital cost because civil works are reduced;
- economy in equipment cost because the aeration equipment is supplied and installed in one reactor only;
- economy in maintenance cost because less aeration equipment is needed and no mechanical decantation devices are to be maintained;
- simpler programmable logic controls or control panel;
- simpler and more efficient operation, because the SBR process is converted into a more "on going" biological process.
- simplified sludge wasting; and
- no idle time required between cycles to balance the sequence as there is only one reactor, thereby resulting again in time saving.
- overflow equipment and functions are integrated into the decanter pipings or troughs.

3. Combined Filling and Decantation

In accordance with the invention, the "filling step" is combined with the "decantation step" and both steps are carried out at the same time. As the batch feed pump introduces rapidly all flow across the whole bottom of the reactor, all treated supernatant water is uniformly collected across the whole surface of the reactor via perforated collectors and/or troughs and finally discharged out of the plant. The decantation and filling rates are therefore much faster.

4. Fast Filling

Considerable time is saved due to a fast filling controlled by the batch fill pump. Typically, the filling time will be approximately ten (10) times faster than the average flow and will take from 1 to 30 minutes (1 to 120 minutes maximum).

5. Fill and Mix

In accordance with the invention, the energy of the "batch feed pump" provides enough energy for mixing the "new" wastewater substrate with the existing sludge inventory in the reactor at the beginning of each sequence, e.g. during the combined "filling-decantation" step when the reactor is operated as a "dynamic clarifier". Thus, the pump energy is used to obtain very efficient anoxic-anaerobic reactions without having to use a separate mechanical mixer device for contacting the biomass with the substrate. If desired, feed pump operation could also be extended to provide extended mixing period using recirculation from the SBR reactor through suitable additional piping and valves.

6. Anoxic Control

"Fast filling" is also very effective to positively drive the oxygen level down so that the whole sludge blanket becomes anoxic rapidly and in a better controlled way. Treatment advantages inherent to this improved control of anoxic conditions are as follows:
- applicability of the process with any aeration device, e.g. diffused air, jet aeration or mechanical aeration, as anoxic mixing is provided by the "batch fill pump" energy;
- biologic phosphorus removal, thereby reducing or eliminating the need for chemicals;

- selective micro-organisms growth (desirable balance of filamentous/floc forming bacteria population); and
- denitrification.

7. Fast Reaction

Because of the extreme food abondant condition created at the beginning of each cycle, organic absorption rates (synthesis) are improved considerably, therefore requiring a shorter reaction period. This results in energy saving improved performances of treatment and increased treatment capacity of treatment plant because of time saving.

8. Air Diffuser Devices

To enable good control of the "anoxic/anaerobic" conditions, the standard process calls for the use of hybrid aeration devices, e.g. Of separate aeration and mixing devices allowing air-independent mixing. Jet aeration, submerged turbine or air diffuser with separate mixer are commonly used.

In accordance the invention, the wastewater feed/distribution system provides a sufficient energy level for the wastewater to come in contact with the whole content of the reactor biomass during the combined "filling and decantation" step, therefore eliminating the need to use a separate mixer or hybrid equipment to obtain desirable "anoxic/anaerobic" conditions at the beginning each cycle.

9. Equalization Tank

In accordance with the invention, use is always made of an equalization tank 29 as is shown in the drawings, to accumulate the wastewater to be fed by the batch feed pump into the SBR reactor. This tank can be provided by an adjacent construction to the SBR reactor 3 or can be part of a remote pump station or any other equalization volume provided in a given system.

The use of a separate equalisation tank for each treatment plant allows the three following process options to assist the dynamic SBR performances.

- Simple Equalization

In this option, the equalization tank is only used to regulate the incoming flow which is simply allowed to accumulate in this equalization tank during the described operating sequence of the invention.

No pretreatment of the pollutants is assumed to occur in the equalization tank. Solid suspension may be controlled by mixing, if desired.

- Equalization/Primary Clarification

This option takes advantage of the wastewater retention to achieve partial pollutant removal by allowing gravity sedimentation to occur.

In this option, the equalization tank is built as a gravity settling tank provided with a solid removal equipment. Such an option provides the equivalent of a primary treatment by removing the settlable solids, therefore reducing the load of pollutants going to the SBR reactor. The removed solids are then treated separately in a digester or in an other solid process treatment.

- Equalization/Anaerobic Fermenter

In this option, the equalization tank is designed to collect, accumulate and promote anaerobic digestion of the solids. The anaerobic biomass is forced to contact the new substrate content in the wastewater by mixing or simply by introducing the new wastewater through the anaerobic biomass accumulated at the bottom of the equalization tank. If desired, optional mixing may be provided to improve contact of the biomass/substrate. Also, optional quick intermittent aeration may be provided to discourage the growth of methanogen and sulphurous bacteria. Odourless and improved processing can be so obtained.

Such option permits several process improvements including:

- transformation of the organic substrate into readily consumable substrate such as fatty acids (acetates, polypropylates . . . ). This transformation favorises further quick absorption of the organics in the SBR reactor.
- Partial organic matter synthesis of the organic matter anaerobically. This also serves as a pretreatment as it will reduce the pollutants loads.
- Production of fatty acids (acetates, poly-propylates . . . ), which is a key-element which will dictate the actual biological phosphorus removal capacity of the system. The anaerobic conditions will cause the bacteria to reject their phosphorus content in the water and to store the fatty acids. The more fatty acids are stored in the bacteria cells, the more phosphorus removal capacity the biological system will be capable of. Under laboratory conditions, the maximum phosphorus absorbtion by the bacteria has been observed to reach 18% of phosphorus expressed as a percentage of the total bacteria cell. This means that the actual performance of this option can be doubled when compared to regular SBR observed capacity (8–10%).

It shall be noted also that the equalization tank can be seeded with bacteria from the SBR reactor, the sludge digester or another source.

10. Fast Decantation

As stated earlier, decantation occurs at the very same time as filling. Accordingly, the standard SBR sequence decantation time is reduced by 30 to 100%. Furthermore, as this step includes the "fast filling" step, decantation occurs in a few minutes only, typically 1 to 30 minutes (as it is the same period of time as for the "filling"). Therefore, tremendous overall hydraulic treatment capacity improvements (30 to 100%) can be achieved.

I claim:

1. A process for treating wastewater in a dynamic bio-sequenced manner in a single sequencing batch (SBR) reactor already filled with an actuated sludge-mixed liquor up to a relatively constant level and provided with decantation means which are fixedly mounted inside the SBR reactor at a given height hereinafter called "clear water level", and in and through which supernatant water on top of said mixed liquor within the SBR reactor may freely enter and be discharged out of the SBR reactor when the level of said mixed liquor within the SBR reactor reaches said decantation means, said SBR reactor being also provided with scum and excess sludge removal means which are fixedly mounted within the SBR reactor at a short elevation under said clear water level and in and through which floating scum and excess sludge in suspension may be collected whenever desired and discharged out of the SBR reactor, said process comprising the steps of:

a) rapidly introducing a given amount of wastewater to be treated into the SBR reactor below the clear water level, such a rapid introduction causing the level of the mixed liquor within the SBR reactor to raise selectively Uniformly and vertically and the supernatant clarified water to enter the decantation means and be discharged out of the SBR reactor;

b) actuating the scum and excess sludge removal means to collect and discharge the scum floating on top of the wastewater filling the SBR reactor, such an actuation also causing the level of the wastewater within the SBR reactor to move down below the clear water level of the decantation means;

c) mixing and aerating the mixed liquor within the reactor SBR to achieve the required wastewater treatment;

d) stirring the mixed liquor within the SBR reactor in a controlled manner and adding a supplemental amount of wastewater into the SBR reactor so as to cause a given amount of sludge to overflow into the scum and excess sludge removal means and thus to be removed from the SBR reactor; and e) allowing the sludge in suspension in the liquor to settle for a period of time sufficient to avoid solids to be carried out with the supernatant water when another given amount of wastewater is introduced into the reactor.

2. The process of claim 1, wherein:
- the decantation means of the SBR reactor comprises at least one member selected from the group consisting of perforated pipes and troughs connected to at least one water exhaust pipe; and
- the scum and excess sludge removal means of the SBR reactor comprises at least one trough connected to a scum exhaust pipe.

3. The process of claim 2, wherein:
- in steps (a) and (d), said given and supplemental amounts of wastewater to be treated are introduced by a batch feed pump.

4. The process of claim 2, wherein
- in steps (a) and (d), said given and supplemental amounts of wastewater to be treated are introduced by gravity from a wastewater source located above the SBR reactor.

5. The process of claim 2, wherein:
- in step (c), said mixing and aeration of the mixed liquor is carried out with devices selected from the group consisting of jet aerators, air diffusers, submerged turbines and mechanical mixers.

6. The process of claim 5, wherein:
- in steps (a) and (d), said given and supplemental amounts of wastewater to be treated are introduced by a batch feed pumps from an equalization tank which is adjacent to said SBR reactor and in which said wastewater to be treated may be accumulated.

7. The process of claim 6, wherein:
- in steps (a) and (d), said given and supplemental amounts of wastewater to be treated are introduced by the batch feed pump at the bottom of the SBR reactor through an inlet flow distribution piping provided with distributor baffles.

8. The process of claim 6, wherein:
- the SBR reactor also comprises a peripheral flow distributing baffle projecting above the clear water level;
- the decantation means are exclusively mounted inside the peripheral flow distributing baffle; and
- in steps (a) and (d), said given and supplemental amounts of wastewater to be treated are introduced by the batch feed pump with the SBR reactor outside said peripheral flow distributing baffle.

9. The process of claim 6, wherein:
- in steps (a) and (d), said given and supplemental amounts of wastewater to be treated are introduced by the batch feed pump within the SBR reactor through a centrally-positioned, wastewater feeding tube.

10. A dynamic clarifier for use to treat wastewater in a bio-sequenced manner, said clarifier comprising:

a) a single sequencing batch (SBR) reactor filled with an activated sludge-mixed liquor up to a relatively constant level;

b) decantation means fixedly mounted inside the SBR reactor at a given height, hereinafter called "clear water level", and in and through which supernatant water on top of said mixed liquor within the SBR reactor may freely enter and be discharged out, said decantation means comprising at least one member selected from the group consisting of perforated pipes and troughs connected to at least one water exhaust pipe leading outside the SBR reactor;

c) scum and excess sludge removal means fixedly mounted within the SBR reactor at a short elevation under said clear water level and in and through which floating scum and excess sludge in suspension may be collected and discharged out of the SBR reactor, said scum and excess sludge removal means comprising at least one trough connected to a common scum and excess sludge exhaust pipe and means to open and close said scum and excess sludge exhaust pipe to let said scum and excess sludge to be discharged and the level of the wastewater within the SBR reactor to move down below the clear water level of the decantation means;

d) a batch feed pump for rapidly introducing wastewater to be treated into the SBR reactor below the clear water level, such a rapid introduction causing the level of the mixed liquor within the SBR reactor to raise relatively uniformly and vertically and the supernatant clarified water and excess sludge to enter the decantation means and be discharged out of the reactor; and e) means for mixing and aerating the mixed liquor within the SBR reactor as long as necessary to achieve the required treatment, said means being selected from the group consisting of jet aerators, air diffusers, submerged turbines and mechanical mixers.

11. The dynamic clarifier of claim 10, further comprising:

f) an equalization tank adjacent the single SBR reactor and in which said wastewater to be treated may be accumulated, said tank being in direct communication with said batch feed pump.

12. The dynamic clarifier of claim 11, wherein said batch feed-pump has an outlet located near the bottom of the SBR reactor, said outlet being in the form of an inlet floor distributing piping provided with distribution baffles.

13. The dynamic clarifier of claim 11, further comprising:

g) a peripheral flow distributing baffle projecting above said clear water level; and
wherein said batch feed pump has an outlet located within the SBR reactor outside said peripheral flow distributing baffle.

14. The dynamic clarifier of claim 11, wherein said batch feed pump has an outlet connected to a wastewater feeding tube centrally positioned within the reactor.

* * * * *